United States Patent [19]
Ehrlick et al.

[11] 3,891,686
[45] June 24, 1975

[54] PREPARATION OF ALUMINUM HYDRIDE TRIALKYLAMINATES

[75] Inventors: Robert Ehrlick, Morristown; Archie R. Young, II, Montclair, both of N.J.

[73] Assignee: Thiokol Corporation, Bristol, Pa.

[22] Filed: May 6, 1963

[21] Appl. No.: 278,802

[52] U.S. Cl. ............................................. 260/448 R
[51] Int. Cl. ................................................ C07f 5/06
[58] Field of Search ................................. 260/448 R

[56] References Cited
UNITED STATES PATENTS
3,541,125  11/1970  Sims................................ 260/448 R

*Primary Examiner*—Leland A. Sebastian
*Attorney, Agent, or Firm*—William R. Wright, Jr.

EXEMPLARY CLAIM

1. A process for preparing aluminum hydride trialkylaminates which comprises contacting lithium aluminum hydride, an aluminum halide and a trialkylamine in an inert solvent under substantially anhydrous conditions until an aluminum hydride trialkylaminate is formed.

11 Claims, No Drawings

PREPARATION OF ALUMINUM HYDRIDE TRIALKYLAMINATES

This invention concerns the preparation of a more stable form of aluminum hydride.

More particularly this invention relates to a novel one step process for preparing aluminum hydride trialkylaminates in good yield, from readily available reactants. The resultant products are free from undesirable contaminants, are stable for extended periods of time and can easily be handled and stored.

Aluminum hydride is a well known and useful reagent for reducing unsaturated organic compounds as well as reducible groups such as carboxyl groups, hydroxyl groups, nitro groups and the like. Unfortunately the free aluminum hydride presently known to commerce has several disadvantages which make its use as a reducing agent hazardous and limit its more widespread use. For example, aluminum hydride reacts vigorously and sometimes explosively with a variety of commonly encountered substances such as water and various oxidizing agents. In addition aluminum hydride is inactivated by contact with oxygen and has poor solubiltiy in the common organic solvents.

To moderate its reactivity and decrease the risks involved in handling and storing it, the aluminum hydride is commonly made available in the solid state in the form of its ethyl etherate. This complex [$AlH_3 \cdot X(C_2H_5)_2O$] while less reactive than the free aluminum hydride is still explosively reactive with moisture and is relatively insoluble in most organic solvents. Because of its poor solubility in organic solvents, the aluminum hydride ethyl etherate and the etherates generally reduce poorly in many organic reaction media in the absence of ethers. For example, these aluminum hydride etherates are relatively ineffective as reducing agents where reducible unsaturates are concerned. Additional disadvantages of the aluminum hydride alkyl etherates as presently available, are contamination with ether and inorganic salts and a complex and tedious preparative process.

Another form of aluminum hydride which is advantageous compared to the free aluminum hydride or the etherates is aluminum hydride trimethylaminate. The substance is more stable than either the free hydride or etherate and cannot readily be deactivated. For example, the aluminum hydride trimethylaminate is relatively insensitive to exposure to water or oxygen and can be stored for extended periods of time. In addition in contrast to the other forms of aluminum hydride, the aluminum trialkylaminate is fairly soluble in organic solvents. These include the ethers, aromatic and aliphatic hydrocarbons as well as the cyclic ethers. The good solubility of the aluminum hydride trimethylaminate in these organic solvents makes the compound much more effective in the reduction of unsaturates as compared to the etherates.

The preparation of the trimethylaminate is reported by Wiberg et al in Z, Naturforsch, [7b, 578 (1952)] and in [Z Anorg U. Allgem. Chem. 272,221 (1953)] journals in which the mono adduct [$AlH_3 \cdot N(CH_3)_3$] and the diadduct are described.

The published procedure requires the initial preparation of the etherate as a reaction intermediate. Since the etherate is tedious to prepare and introduces the contaminated etherate as a reactant it leaves much to be desired. In addition the monoadduct always contains a small but significant amount of ether as a contaminant probably from the presence of the coordination compound:

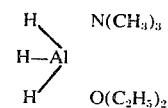

The above compound is relatively poor as a reducing agent and it is exceedingly difficult to completely remove the monoadduct from the aluminum hydride trimethylaminate product. Because of these problems that arise in the handling of aluminum hydride and the difficulties encountered in the preparation of the ether complexes, the preparation of a stable, active, highly purified trialkylaminate is an important step forward in synthetic organic chemistry.

It is therefore an object of this invention to prepare a stable and easily handled form of aluminum hydride which is highly active as a reducing agent.

It is another object of this invention to prepare a form of aluminum hydride which is relatively insensitive to water or oxygen.

It is a further object of this invention to prepare an aluminum hydride complex which is soluble in a variety of organic solvents and effectively reduces reducible unsaturates.

Yet another object of this invention to prepare the aluminum hydride trimethylaminate as the monoadducts free from polymeric or solvent contaminates which decrease the effectiveness of the compounds as reducing agents.

Other objects of this invention are the preparation of trialkylaminates generally from readily available starting materials, through a one step process and in good yield.

These objects are accomplished by the novel process described below:

The novel reaction is as follows:

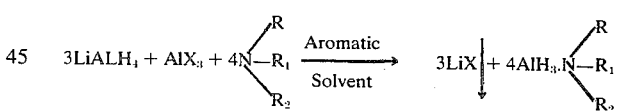

wherein X is a halogen, R, $R_1$ and $R_2$ which can be the same or different are alkyl groups, straight chain or branched chain, joined or conjoined.

Examples of aluminum hydride trialkylaminates include among many others, those aminates in which all three alkyl substituents on the nitrogen are alike including among others: aluminum hydride trimethylaminate, aluminum hydride triethylaminate, aluminum hydride tripropylaminate, aluminum hydride triisopropylaminate, aluminum hydride tributylaminate, the aluminum hydride tripentylaminates, the aluminum hydride triisopentylaminates, aluminum hydride trihexylaminate, the aluminum hydride triisohexylaminates and aluminum hydride triicycohexylaminate, as well as aminates in which one or more of the three alkyl substituents are unlike. The latter include aluminum hydride dimethylethylaminate, aluminum hydride methylethylpropylaminate among others.

In practice the reaction is run by adding the trialkylamine either as the free gas (or liquid or solid as the case may be) or as a solution of the gas or liquid or solid in an inert solvent such as benzene or toluene to an agitated slurry of the lithium aluminum hydride and aluminum halide in an inert solvent such as benzene or toluene. After the reaction is complete as indicated by the appearance of a white lithium halide precipitate, an inert gas is added and any excess trialkylamine reactant if present is driven off by heating. The slurry is allowed to cool down and the agitation continued for 2 – 4 hours more. The filtrate containing the product dissolved in solvent is filtered off under the inert atmosphere and can be retained as such or the adduct can be recovered by evaporating the solvent off under vacuum. The solution of the adduct in solvent is stable and is advantageous over the solvent-free adduct since it is more readily handled and stored than the solvent-free adduct is.

The novel reaction of this invention is operable over a wide range of reaction conditions such as order of adding reactants, temperature, pressure and reaction time. For example the order of addition of the reactants is unimportant. Similarly the operable process temperatures range from 5° to 150°C., with the narrower temperature range of 20° to 60°C representing the preferred temperature range. While the reaction is customarily conducted at atmospheric pressure it can be conducted at either sub or superatmospheric pressures. The ratio of reactants is not critical as long as at least a stoichiometric quantity of trialkylamine (based upon the equation shown supra) is present. While aluminum chloride is the favored aluminum halide because of cost and commercial availability as well as its good solubility in the solvents used in the process, the other anhydrous aluminum halides are satisfactory. The time needed to assure completion of the reaction is a variable dependent upon reaction conditions including reactants, temperature and pressure. For this reason the reaction time cannot be stated with precision. However, the extremes of reaction time are between 2 and 72 hours with 4 to 16 hours being the more usual time.

The novel process of this invention is advantageous in several respects. For example the trialkylaminate products of this invention are prepared in substantially quantitative yield from commercially available starting materials. In addition, as indicated above, the novel process is operable over a wide range of reaction conditions using inexpensive process equipment. An additional advantage over the preparative process of the prior are is in the quality of the aluminum hydride trialkylaminate produced. That is, the products of this invention are obtained as relatively pure mono-adducts free from contaminating solvents or salts. In contrast, the products obtained from the prior art process contains significant quantities of ether, inorganic salts and polymeric contaminants.

Additional advantages of this invention as well as a detailed description of the process conditions will become apparent from the following submitted examples.

EXAMPLE 1

Preparation of Aluminum Hydride Trimethylaminate.

To a conveniently sized reaction flash fitted with a reflux condenser, a means of agitation and provision for heating and cooling, are added the following reactants: 1 part of powdered lithium aluminum hydride, 1 part of powdered anhydrous aluminum chloride and 40 parts by weight of anhydrous benzene. The suspension is slurried by means of vigorous agitation and a stoichiometric excess of trimethylamine gas (computed on the basis of lithium aluminum hydride) is bubbled into the reaction slurry for 45 minutes. At the end of this time the flow of trimethylamine gas is cut off and a stream of dry nitrogen substituted instead. The reaction mixture is then heated to 60°C with continued agitation and the excess trimethylamine driven off. During the removal of the trimethylamine, a voluminous white precipitate of lithium chloride appears. The reaction mixture is agitated for an additional 3 hours, cooled down and filtered off by suction under the nitrogen atmosphere.

The filtered solids are washed with additional anhydrous benzene and the wash added to the filtrate. Evaporation of a 25 ml aliquot of the benzene solution produced a solid adduct whose identity as aluminum hydride trimethylaminate is confirmed by infra-red analysis and hydrolysis studies. The aluminum content of the degraded product indicates a quantitative yield of product based upon lithium aluminum hydride starting material.

EXAMPLE 2

Preparation of Aluminum Hydride Triethylaminate.

The same equipment and technique described in Example 1 is used. One mole of powdered lithium aluminum hydride is mixed with 0.33 moles of powdered anhydrous aluminum chloride and 1000 ml of anhydrous toluene under a nitrogen atmosphere using vigorous agitation to slurry the mixture. Triethylamine, 1.33 moles is added slowly dropwise over a period of 1 hour. The agitated slurry is heated to 50°C for 4 hours and then cooled to room temperature. The precipitated lithium chloride is filtered off under an inert atmosphere and washed with anhydrous toluene. The toluene washings are combined with the toluene filtrate and the adduct produced by evaporating off 25 ml of the toluene solution under vacuum below room temperature. Infra-red analysis and hydrolysis confirmed the structure of the product to be $AlH_3 \cdot N(C_2H_5)_3$.

EXAMPLES 3 –5

Preparation of other Aluminum Hydride Trialkylaminates.

Using the same equipment, techniques and procedures described in Example 1 and 2, the following aluminum trialkylaminates are prepared:

| Reactants | Product |
| --- | --- |
| Lithium Aluminum Hydride + Tributylamine | Aluminum Hydride Tributylaminate |
| Lithium Aluminum Hydride + Trihexylamine | Aluminum Hydride Trihexylaminate |
| Lithium Aluminum Hydride + Tricyclohexylamine | Aluminum Hydride Tricyclohexylaminate |

In all instances the products structure is confirmed by infra-red analysis and quantitative hydrolysis.

We claim:

1. A process for preparing aluminum hydride trialkylaminates which comprises contacting lithium aluminum hydride, an aluminum halide and a trialkylamine in an inert solvent under substantially anhydrous conditions until an aluminum hydride trialkylaminate is formed.

2. The process of claim 1 wherein the trialkylamine is trimethylamine and the product is aluminum hydride trimethylaminate.

3. The process of claim 1 wherein the trialkylamine is triethylamine and the product is aluminum hydride triethylaminate.

4. The process of claim 1 wherein the trialkylamine is tripropylamine and the product is aluminum hydride tripropylaminate.

5. The process of claim 1 wherein the trialkylamine is tributylamine and the product is aluminum hydride tributylaminate.

6. The process of claim 1 wherein the trialkylamine is tripentylamine and the product is aluminum hydride tripentylaminate.

7. The process of claim 1 wherein the trialkylamine is trihexylamine and the product is aluminum hydride trihexylaminate.

8. A method for forming aluminum hydride trialkylaminates comprising, in combination, the steps of:
   a. reacting a trialkyl amine and an aluminum halide with a lithium aluminum hydride in the presence of an inert solvent; and,
   b. recovering the complex formed in the reaction mixture, said steps being carried out under an atmosphere inert with respect to reactants and products.

9. The method of claim 8 wherein said trialkyl amine is trimethylamine, and said aluminum halide is aluminum chloride.

10. The method of claim 8 wherein said trialkyl amine is triethylamine and said aluminum halide is aluminum chloride.

11. The method of claim 8 wherein said solvent is selected from the group consisting of toluene and benzene.

* * * * *